(12) United States Patent
Kim

(10) Patent No.: US 6,925,487 B2
(45) Date of Patent: Aug. 2, 2005

(54) SYSTEM AND METHOD FOR EXCHANGING ONLINE INFORMATION OVER PRIVATE NETWORK

(75) Inventor: Jae Hoon Kim, Seoul (KR)

(73) Assignee: Polypix Inc., Seoul (KR)

( * ) Notice: Subject to any disclaimer, the term of this patent is extended or adjusted under 35 U.S.C. 154(b) by 860 days.

(21) Appl. No.: 09/891,369

(22) Filed: Jun. 27, 2001

(65) Prior Publication Data

US 2002/0111998 A1 Aug. 15, 2002

(30) Foreign Application Priority Data

Feb. 12, 2001 (KR) .......................................... 2001-6719

(51) Int. Cl.[7] .............................................. G06F 15/16
(52) U.S. Cl. ...................... 709/203; 709/238; 709/225; 709/227; 709/228; 370/466
(58) Field of Search ................. 709/203, 225, 709/227, 228, 238; 370/466

(56) References Cited

U.S. PATENT DOCUMENTS

| | | | | | |
|---|---|---|---|---|---|
| 6,128,298 A | * | 10/2000 | Wootton et al. | ............ | 370/392 |
| 6,496,867 B1 | * | 12/2002 | Beser et al. | ................ | 709/245 |
| 6,697,377 B1 | * | 2/2004 | Ju et al. | ..................... | 370/466 |
| 6,718,030 B1 | * | 4/2004 | Turner et al. | .......... | 379/221.02 |
| 6,731,642 B1 | * | 5/2004 | Borella et al. | .............. | 370/401 |

* cited by examiner

*Primary Examiner*—Dung C. Dinh
*Assistant Examiner*—Dohm Chankong
(74) *Attorney, Agent, or Firm*—Birch, Stewart, Kolasch & Birch, LLP (57) ABSTRACT

A system and method for exchanging online information over a private network. A client with a private Internet protocol (IP) address can exchange a user datagram protocol (UDP) packet with a server with a public IP address according to a real time protocol by first sending information about its IP address to the server such that a router connecting the server to the client maps the sent IP address information to the client. Therefore, the client and server can perform two-way UDP packet communications therebetween. This enables a client with a private IP address to perform two-way voice packet communications with a Voice Over IF (VoIP) provider.

15 Claims, 6 Drawing Sheets

| P1 | definition | User index: 4 bytes | | |
|---|---|---|---|---|
| P2 | definition | Count | User index: 4 bytes | •••• |
| P3 | private network | definition | User index: 4 bytes | |
| P4 | server | definition | IP : 4 bytes | |
| P5 | definition | IP: 4 bytes or NULL | | |
| P6 | private network | definition | User index: 4 bytes | |
| P7 | server | definition | IP : 4 bytes | |

Fig. 5a

SYSTEM AND METHOD FOR EXCHANGING ONLINE INFORMATION OVER PRIVATE NETWORK

BACKGROUND OF THE INVENTION

1. Field of the Invention

The present invention relates in general to the exchange of online information over a private network, and more particularly to a system and method for exchanging online information over a private network, wherein a server can send user datagram protocol (referred to hereinafter as UDP) standard-based data to a client connected thereto over the private network so that it can exchange the online information with the client according to a real-time protocol.

2. Description of the Prior Art

Recently, the number of Internet users has rapidly increased, resulting in a shortage of Internet protocol (referred to hereinafter as IP) addresses. In order to solve such a shortage of Internet protocol addresses and enable accesses of a larger number of persons to an Internet network, there have been proposed private IP addresses, which have been often used for additional applications such as security and load balancing.

Because such a private IP address is unique only in a private network, it must be translated into a public IP address to enable an associated client to gain access to a server over an Internet network connected to a public network. The translation of a private IP address into a public IP address is typically called a network address translation (referred to hereinafter as NAT).

Provided that a client desiring to use online information over the Internet network employs not a public IP address, but a private IP address, a router acting to route the client to a server with a public IP address performs the NAT function to translate the private IP address employed by the client into a public IP address for access of the client to the server providing information desired by the client.

The NAT may generally be classified into a static NAT and a dynamic NAT according to methods for translating a private IP address into a public IP address. Masquerading may be a special dynamic NAT.

The static NAT is applied to the case where private IP addresses are the same in number as public IP addresses. In this case, the static NAT is adapted to translate private IP addresses into public IP addresses at one-to-one regular intervals.

The dynamic NAT is applied to the case where private IP addresses are greater in number than public IP addresses. In this case, the dynamic NAT is adapted to assign public IP addresses dynamically to private IP addresses. As a result, a public IP address assigned dynamically to a private IP address is significant only when a client and server are kept connected to each other. Provided that the connection between the server and client is released, it will be impossible to gain access to the client using the public IP address assigned to the client. In this regard, the dynamic NAT function is often used in association with security related functions.

The masquerading function is applied to the case where one public IP address is employed. For connection of a plurality of clients with private IP addresses to an external server via one public IP address, port numbers are assigned respectively to the clients in addition to the public IP address, such that the plurality of private IP addresses are mapped to the single public IP address.

A client, connected to an external server over a private network on the basis of any NAT function as mentioned above, has an IP address on the private network, or a private IP address, different from an IP address for its actual address to the external server via a router, or a public IP address.

Figure 1:
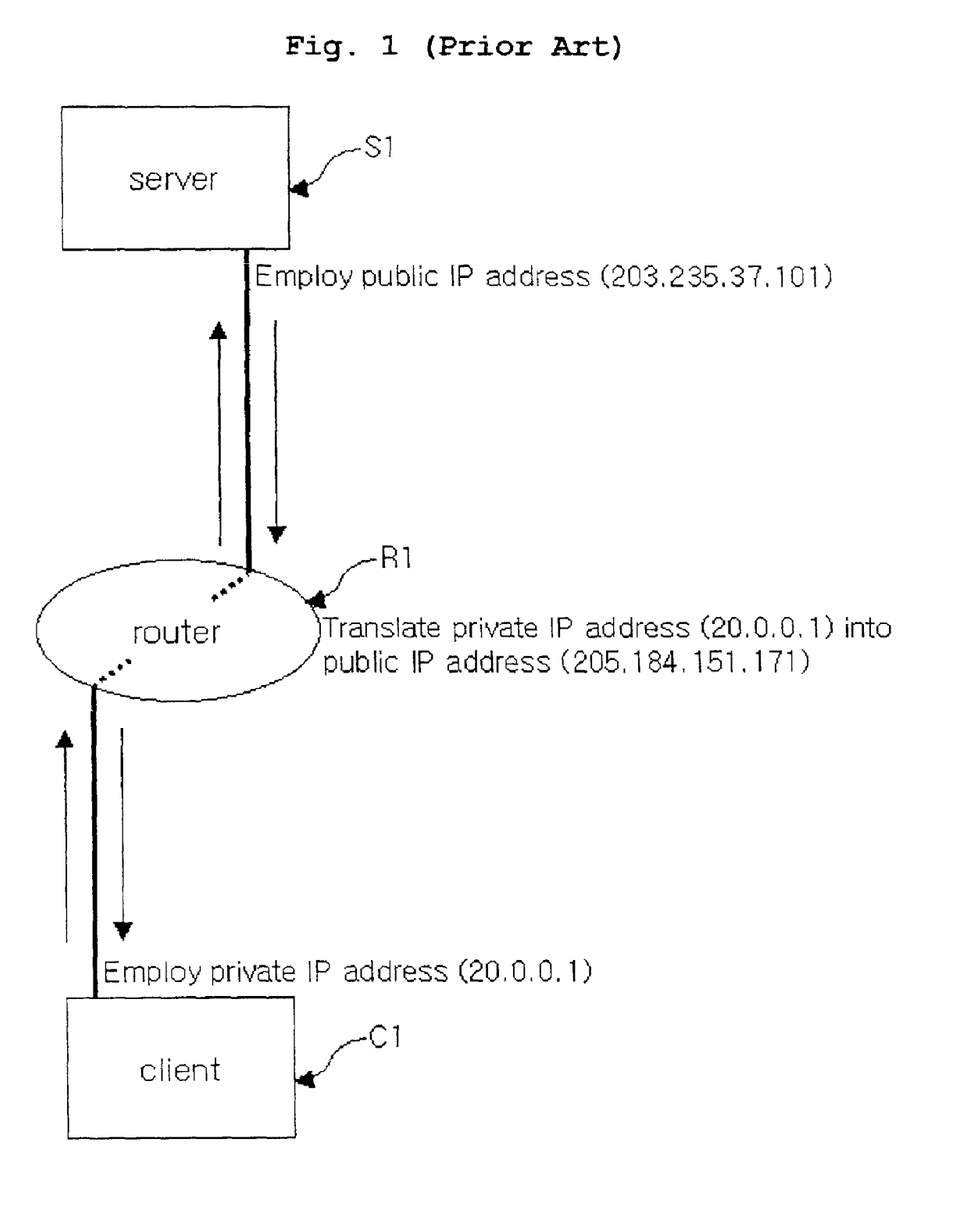
FIG. 1 is a block diagram illustrating a conventional method for exchanging a transmission control protocol (TCP) packet over a private network.
Figure 2:
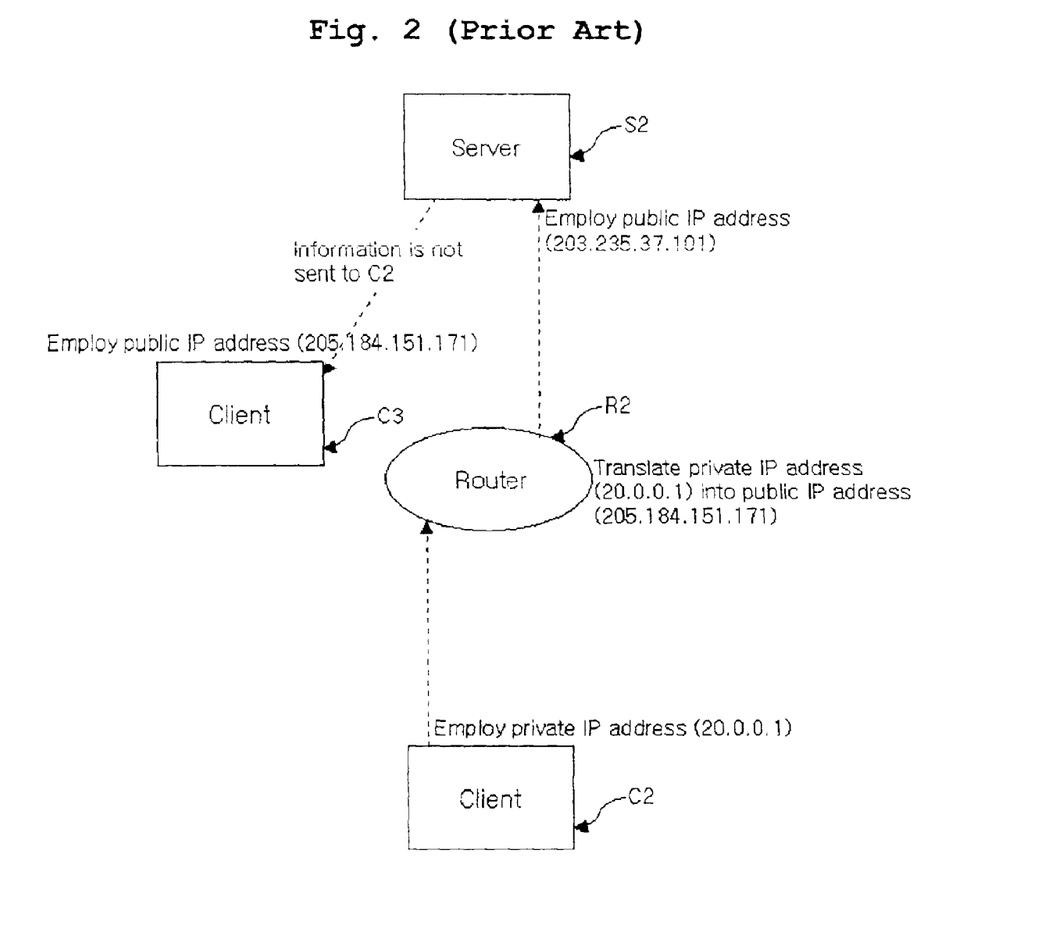
FIG. 2 is a block diagram illustrating a conventional method for exchanging a user datagram protocol (UDP) packet over a private network.

Accordingly, as shown in FIG. 1, there is no problem for a client C1, connected to an external server S1 over a private network on the basis of an NAT function, to exchange transmission control protocol (referred to hereinafter as TCP) standard-based information with the external server S1 via a router R1, in that the TCP standard-based information can be sent and received under the condition that the client C1 and server S1 are kept connected to each other. However, as shown in FIG. 2, it is practically next to impossible for a client C2 to exchange user datagram protocol (referred to hereinafter as UDP) standard-based information with a server S2, because the UDP standard-based information may be sent and received under the condition that the client C2 and server S2 are not connected to each other, in a different manner from the TCP standard-based information.

In other words, an IP address '205.184.151.171' of the client C2 for actual access to the server S2 via a router R2 is different from a private IP address '20.0.0.1' of the client C2 in the private network. For this reason, a UDP packet, sent from the server S2 with a public IP address '203.235.37.101' to the client C2, is directed not to the client C2, but to a different client C3 with a public IP address '205.184.151.171'.

In particular, a voice packet with voice information complies with a real time protocol (referred to hereinafter as RTP), which is based on the UDP standard. In this connection, it is actually impossible to send a UDP packet to the client employing the NAT function as stated above.

In practice, many Voice Over IP (VoIP) providers for providing voice information sending/receiving services are also unable to perform two-way communications for a UDP standard-based packet with the NAT-based client as stated above.

SUMMARY OF THE INVENTION

Therefore, the present invention has been made in view of the above problem, and it is an object of the present invention to provide a system and method for exchanging online information over a private network, wherein a client with a private Internet protocol address can perform two-way communications for user datagram protocol standard-based information with a server.

In accordance with one aspect of the present invention, the above and other objects can be accomplished by the provision of a method for exchanging online information over a private network in a client/server system, the client/server system including a client for sending and receiving the online information over an Internet network, and a server connected to the client via a router, the method comprising the steps of a), by the server, determining whether the client uses the private network and sending the determined result to the client; b), by the client, sending information about its valid Internet protocol (IP) addresses and information about its actually used IP address to the server if the result determined at the step a) indicates that the client uses the private network; c), by the server, sending acknowledgement information to all of the IP addresses contained in the information sent at the step b), the acknowledgement information containing information regarding an IP address of the client for actual access to the server via the router; d), by the client, determining from the acknowledgement information sent at the step c) whether it employs a private IP address; and e), by the router, storing the information about the actually used IP address of the client if it is determined at the step d) that the client employs the private IP address, and then exchanging the online information between the server and the client via the actually used IP address of the client.

In accordance with another aspect of the present invention, there is provided a system for exchanging online information over a private network in a client/server system, the client/server system including a client for sending and receiving the online information over an Internet network, and a server connected to the client via a router, wherein the client is adapted for sending first information about its Internet protocol (IP) address for access to the server, to the server upon accessing the server, determining whether it uses the private network, from first acknowledgement information sent from the server in response to the first information, and sending second information to the server upon determining that it uses the private network, the second information containing information about valid IP addresses of the client and information about an actually used IP address of the client; the server is adapted for comparing the access IP address contained in the first information sent from the client with an IP address of the client for actual access to the server via the router to determine whether the two IP addresses are the same, sending the determined result as the first acknowledgement information to the client and then sending second acknowledgement information to all of the IP addresses contained in the second information, sent from the client in response to the first acknowledgement information, such that the client determines on the basis of the second acknowledgement information whether it employs a private IP address, the second acknowledgement information containing information regarding the IP address of the client for actual access to the server via the router; and the router is adapted for storing the information about the actually used IP address of the client if the client determines on the basis of the second acknowledgement information from the server that it employs the private IP address, and then delivering a message sent from the server to the client via the actually used IP address of the client stored therein, such that the client exchanges the online information with the server.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 3:
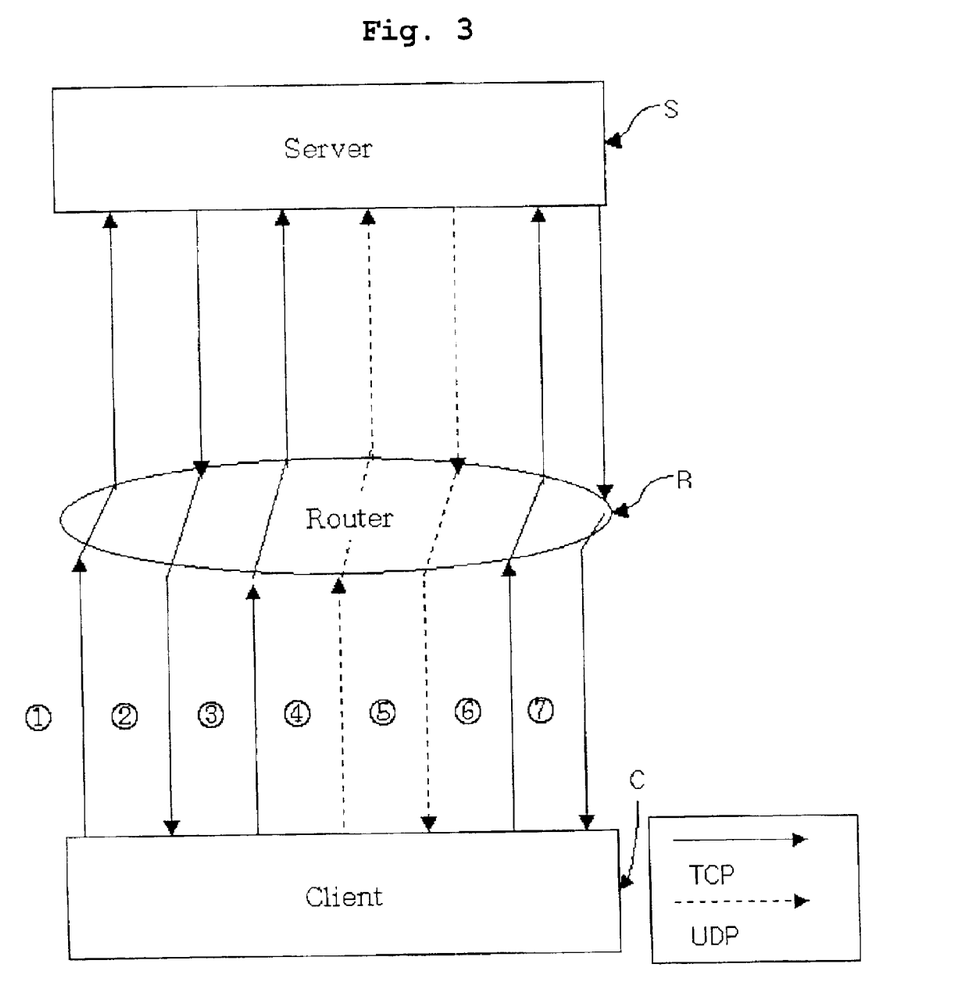
FIG. 3 is a block diagram illustrating the flow of information in a system for exchanging online information over a private network in accordance with the present invention.

FIG. 3 is a block diagram illustrating the flow of information in a system for exchanging online information over a private network in accordance with the present invention. As shown in this drawing, the present online information exchange system comprises a router R, a server S, and a client C for sending and receiving online information to/from the server S through the router R.

The client C may employ a plurality of private or public Internet protocol (IP) addresses. Provided that the client C employs a private IP address, it will use a private network. In this case, the private IP address of the client C is translated into a public IP address by an NAT function of the router R upon accessing the external server S.

The server S exchanges online information with the client C connected thereto via the router R. In order to perform two-way communications for a real time protocol (RTP)/ user datagram protocol (UDP) standard-based packet with the client C, the server S must determine whether the client C uses a private network and in turn from the determined result whether the client C employs a private IP address.

Thus, the client C sends to the server S first information ($\in$ in FIG. 3) about its IP address for access to the server S. In response to the first information from the client C, the server S sends first acknowledgement information ($\notin$ in FIG. 3) to the client C, which then determines from the first acknowledgement information whether it uses a private network. Thereafter, for a determination as to whether the client C employs a private IP address, the client C sends to the server S a transmission control protocol (TCP) packet ($\angle$ in FIG. 3) with information about its valid IP addresses and a UDP packet ($\nabla$ in FIG. 3) with information about its actually used IP address.

It should be noted herein that the access IP address and the actually used IP address may be different or the same in that the client C may employ a plurality of IP addresses as needed.

Upon receiving the first information about the access IP address from the client C, the server S compares the access IP address with an IP address of the client C for actual access to the server S via the router R, namely, a public IP address of the client C recognized by the server S.

In case the access IP address is the same as the actual access IP address, it is signified that the client C is connected to the sever S not via a private network, but via a public IP address. As a result, the server S can perform two-way communications for a UDP packet with the client C without any problem.

Alternatively, in the case where the access IP address is not the same as the actual access IP address, it is signified that the client C uses a private network. In this case, a determination must be made as to whether the client C employs a private IP address, or a public IP address under the condition that it uses a proxy server to use a private network.

Accordingly, the server S determines whether the access IP address is the same as the actual access IP address and then sends the first acknowledgement information to the client C as a result of the determination.

Where the client C recognizes on the basis of the first acknowledgement information from the server S that the access IP address is different from the actual access IP address, namely, that the client C uses a private network, then it sends to the server S second information consisting of information about a list of its valid IP addresses in the form of a TCP packet and information about its actually used IP address in the form of a UDP packet. In that the server S has a public IP address, the client C can send a UDP packet to the server S at any time.

The server S sends a UDP packet (® in FIG. 3) with second acknowledgement information to all of the IP addresses contained in the second information from the client C. The second acknowledgement information contains information regarding an IP address of the client C for actual access to the server S via the router R.

The client C compares a list of all IP addresses thereof with the IP address contained in the second acknowledgement information from the server S. Where any one of the IP addresses in the list is the same as the IP address contained in the second acknowledgement information, it is signified that the client C has a public IP address but operates on a private network, namely, it uses a proxy server. In case none of the IP addresses in the list is the same as the IP address contained in the second acknowledgement information, it is indicated that the client C is connected to the server S via a private IP address on a private network on the basis of the NAT function of the router R.

The server S can send a UDP packet directly to the client C if the client C uses a proxy server, but cannot do so if the client C employs a private IP address.

As a result, in case of determining that the client C uses a private network and also employs a private IP address, the client C notifies the server S of such a fact (© in FIG. 3), thereby allowing the server S to control the router R in such a manner that the router R stores information regarding an actually used IP address of the client C and maps it to the client C.

With the information regarding the actually used IP address of the client C, or information about a private IP address of the client C, stored in the router R, the server S can send a UDP packet (™ in FIG. 3) to the client C via the router R even though it does not know the private IP address of the client C.

In other words, if the server S sends a UDP packet to the router R, then the router R delivers the sent UDP packet to the client C on the basis of private IP address information pre-stored therein. Therefore, the client C can perform two-way communications for a UDP packet with the external server S even when it employs a private IP address.

On the other hand, unless a UDP packet is exchanged between the client C and the server S for a predetermined period of time or more, the router R releases the IP address mapped to the client C.

Figure 4:
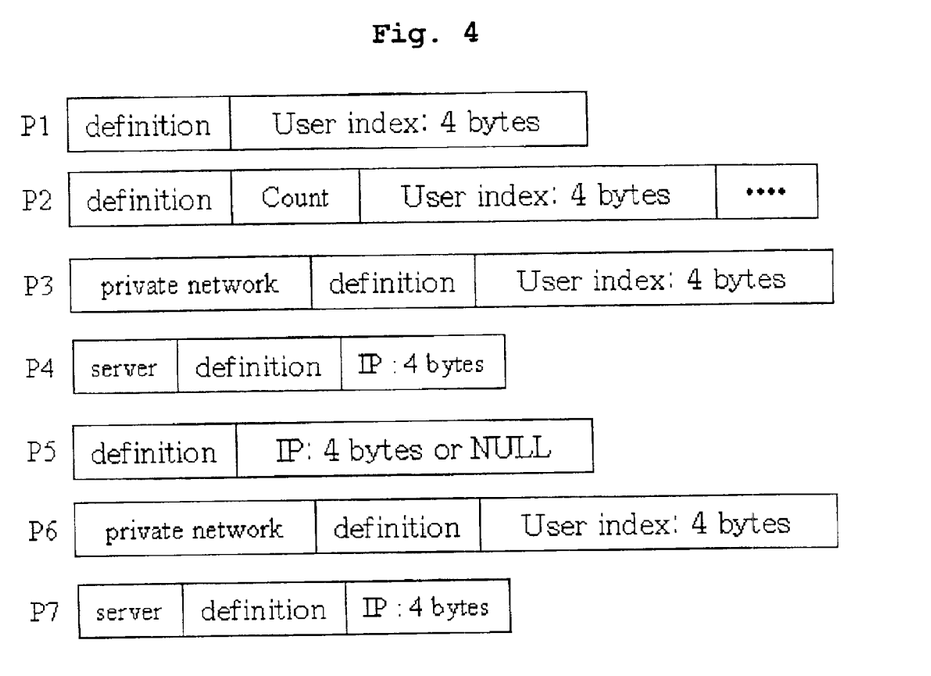
FIG. 4 is a block diagram showing formats of packets sent and received in the online information exchange system in accordance with the present invention.

FIG. 4 is a block diagram showing formats of packets sent and received in the online information exchange system in accordance with the present invention.

In FIG. 4, "P1" represents a packet sent as indicated by ∉ in FIG. 3, which is composed of a definition statement for defining the packet, and a 4-byte user index statement for identifying a client sending the packet later over a private network. For example, private IP addresses of two or more clients may be transformed into the same public IP address by masquerading. In this case, the use of the user index statement makes it possible to distinguish a client attempting to exchange a UDP packet with the server S, from the clients with the same public IP address.

"P2" represents a packet sent as indicated by ∠ in FIG. 3. This packet is composed of a definition statement, a count statement for counting the number of IP addresses, an IP statement for representing an IP address, and a repeated sequence thereof.

"P3" represents a packet sent as indicated by ∇ in FIG. 3. This packet is composed of a private network statement for indicating the use or not of a private network, a definition statement and a user index statement. The user index statement of P3 makes it possible for the server S to distinguish a specific client from other clients sending various information.

"P4" represents a packet sent as indicated by ® in FIG. 3, which is composed of a server statement for indicating that this packet is sent from the server, a definition statement, and an IP statement for representing an IP address of a specific client for actual access to the server.

"P5" represents a packet sent as indicated by © in FIG. 3, which is composed of a definition statement and IP statement. The IP statement of P5 contains information about a public IP address of the client C when the client C employs the public IP address, and a character NULL when the client C employs a private IP address. Hence, the use of this IP statement enables the server S to determine whether the client C employs a private IP address.

"P6" represents a packet sent only when the client C employs a private IP address. Where the client C with the private IP address desires to access an external Internet network with a public IP address, or the server S attempts to access the client C, then the client C sends a UDP packet with a private network statement, definition statement and user index statement according to the RTP.

"P7" also represents a packet sent only when the client C employs a private IP address, which is indicated by ™ in FIG. 3. This packet includes a server statement, a definition statement, and an IP statement composed of NULL.

A detailed description will hereinafter be given of the operation of the online information exchange system with the above-stated construction in accordance with the present invention with reference to FIGS. 5a and 5b.

Figure 5A:
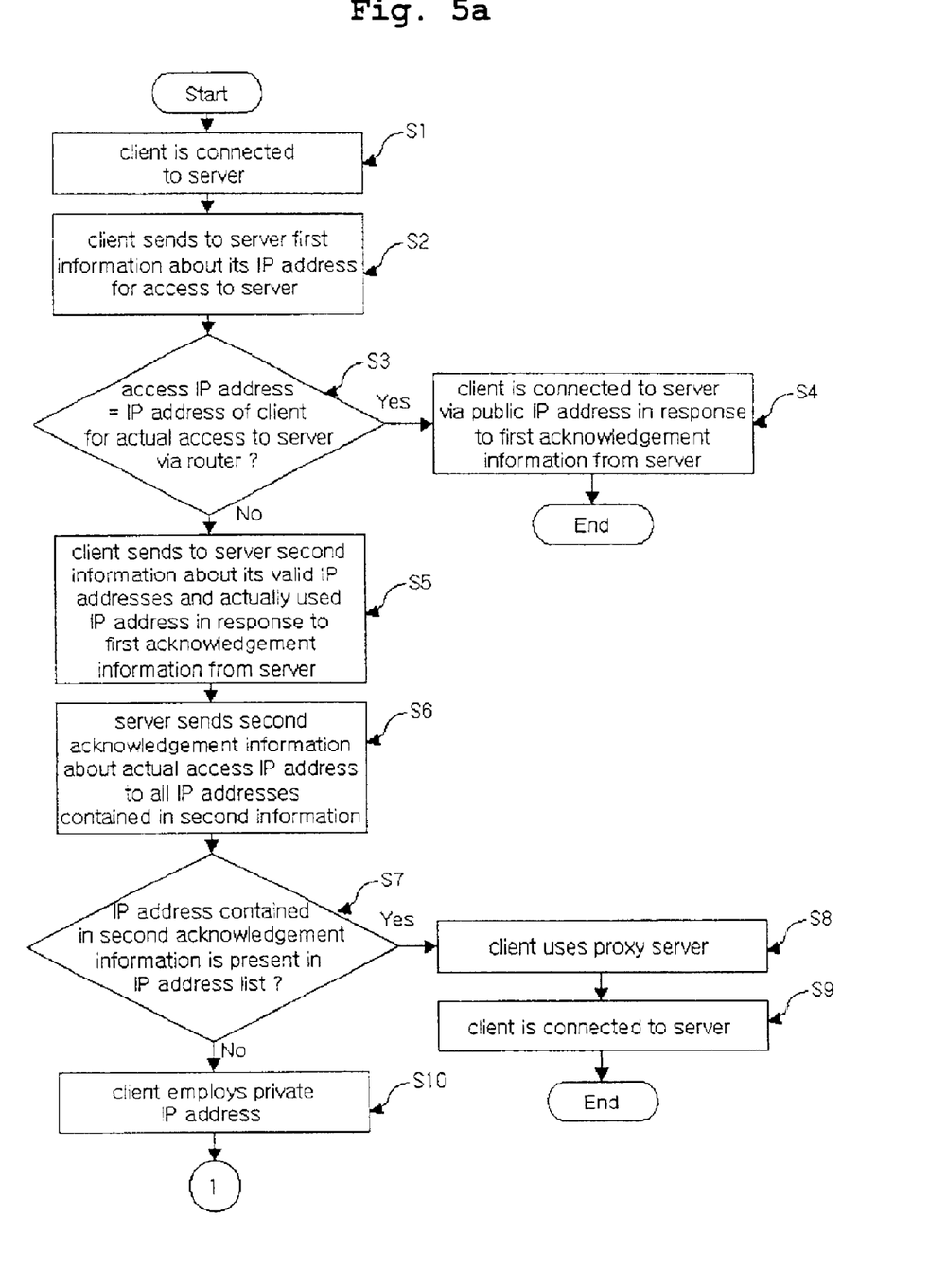
FIGS. 5a and 5b are flowcharts illustrating a method for exchanging online information over a private network in accordance with the present invention.
Figure 5B:
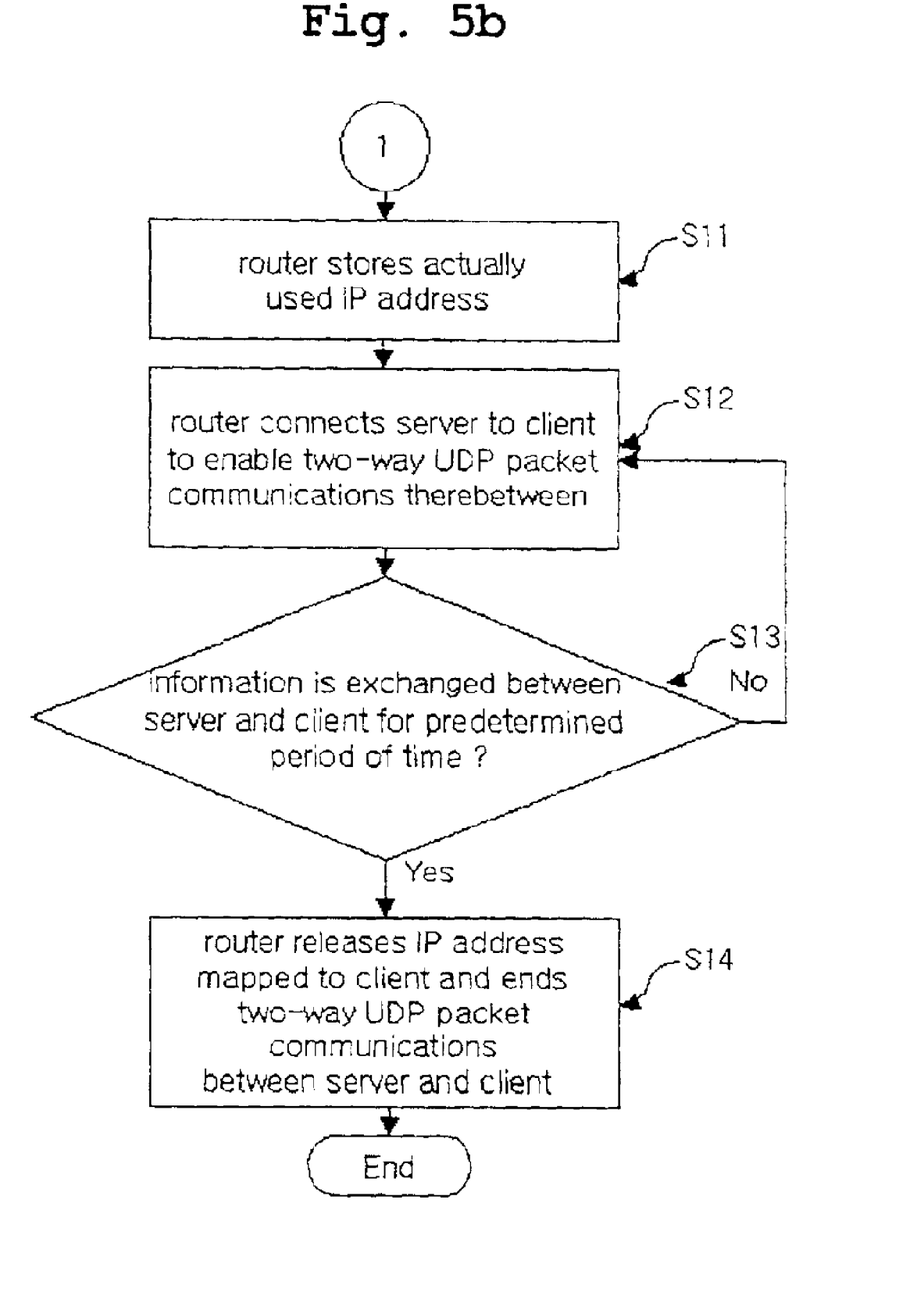

FIGS. 5a and 5b are flowcharts illustrating a method for exchanging online information over a private network in accordance with the present invention.

At the first step S1, a client with a plurality of private or public IP addresses is connected to a server with a public IP address via an IP address for access to the server.

At the second step S2, the client sends first information about the access IP address to the server.

At the third step S3, the server compares the access IP address contained in the first information sent from the client at the above second step S2 with an IP address of the client for actual access to the server via a router to determine whether the two IP addresses are the same, and then determines from the compared result whether the client uses a private network. The server then sends the determined result as first acknowledgement information to the client.

In the case where it is determined at the above third step S3 that the access IP address and the actual access IP address are the same, it is signified that the client employs a public IP address. As a result, the client is connected to the server via the public IP address in response to the first acknowledgement information from the server at the fourth step S4.

In case it is determined at the above third step S3 that the access IP address and the actual access IP address are not the same, it is signified that the client uses a private network. As a result, at the fifth step S5, in response to the first acknowledgement information from the server, the client sends to the server second information consisting of information about its valid IP addresses in the form of a TCP packet and information about its actually used IP address in the form of a UDP packet.

At the sixth step S6, the server sends a UDP packet with second acknowledgement information to all of the IP addresses contained in the second information sent from the client at the above fifth step S5. The second acknowledgement information contains information regarding an IP address of the client for actual access to the server via the router.

At the seventh step S7, the client compares a list of IP addresses thereof with the IP address contained in the second acknowledgement information sent from the server at the above sixth step S6 to determine whether the IP address contained in the second acknowledgement information is present in the IP address list.

Where the IP address contained in the second acknowledgement information is determined to be present in the IP address list at the above seventh step S7, the client recognizes that it uses a private network but employs a public IP address, namely, it uses a proxy server. The client then notifies the server of the fact that it employs no private IP address, at the eighth step S8.

At the ninth step S9, the client is connected to the server via the public IP address on the private network to exchange online information with the server.

On the other hand, in case the IP address contained in the second acknowledgement information is determined not to be present in the IP address list at the above seventh step S7, the client recognizes that it employs a private IP address, and then notifies the server of the fact that it employs the private IP address, at the tenth step S10.

At the eleventh step S11, the router stores an actually used private IP address of the client and maps it to the client.

At the twelfth step S12, the router connects the server to the client via the actually used private IP address of the client stored therein to deliver online information sent from the server to the client. Therefore, the server can send a UDP packet to the client via the actually used private IP address of the client stored in the router.

At the thirteenth step S13, the router determines whether information is exchanged in a UDP packet form between the server and the client for a predetermined period of time. Upon determining that the information is exchanged between the server and the client, the router maintains the connection made at the above twelfth step S12.

Alternatively, if it is determined at the above thirteenth step S13 that no information is exchanged between the server and the client for the predetermined time period, then the router releases the IP address mapped to the client at the above eleventh step S11 and ends two-way UDP packet communications between the server and the client, at the fourteenth step S14.

In the above manner, two-way UDP packet communications can be performed between a client with a private IP address and a server. If the client desires to conduct two-way UDP packet communications with the server, it can attain the desired purpose by first sending a UDP packet to the server in the above manner.

For a client whose private IP address is transformed into a public IP address by masquerading, information regarding a used port as well as the private IP address is previously notified to a server as a UDP packet destination and a router and then mapped by the router. Thus, the server can also send a UDP packet to a client whose private IP address is transformed into a public IP address by the masquerading.

As apparent from the above description, the present invention provides a system and method for exchanging online information over a private network, wherein a client with a private IP address can exchange a UDP packet with a server with a public IP address according to a real time protocol by first sending information about its IP address to the server such that a router connecting the server to the client maps the sent IP address information to the client. Therefore, the client and server can perform two-way UDP packet communications therebetween.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for exchanging online information over a private network in a client/server system, said client/server system including a client for sending and receiving the online information over an Internet network, and a server connected to said client via a router, said method comprising the steps of:

a), by said server, determining whether said client uses said private network and sending the determined result to said client;

b), by said client, sending information about its valid Internet protocol (IP) addresses and information about its actually used IP address to said server if said result determined at said step a) indicates that said client uses said private network;

c), by said server, sending acknowledgement information to all of said IP addresses contained in said information sent at said step b), said acknowledgement information containing information regarding an IP address of said client for actual access to said server via said router;

d), by said client, determining from said acknowledgement information sent at said step c) whether it employs a private IP address; and     e), by said router, storing said information about said actually used IP address of said client if it is determined at said step d) that said client employs the private IP address, and then exchanging the online information between said server and said client via said actually used IP address of said client.

2. The online information exchange method as set forth in claim 1, wherein said step a) includes the steps of:

a-1), by said client, sending to said server information about its IP address for access to said server;

a-2), by said server, comparing said access IP address with an IP address of said client for actual access to said server via said router to determine whether the two IP addresses are the same, and then determining from the compared result whether said client uses said private network; and     a-3), by said server, sending the determined result to said client.

3. The online information exchange method as set forth in claim 2, wherein said step a-1) includes the step of, by said client, sending a transmission control protocol (TCP) standard-based packet with said information about said access IP address to said server upon accessing it.

4. The online information exchange method as set forth in claim 1, wherein said step b) includes the step of, by said client, recognizing that it is connected to said server via a public IP address, if said result determined at said step a) indicates that said client uses no private network, and then gaining access to said server via said public IP address to exchange the online information with said server.

5. The online information exchange method as set forth in claim 1, wherein said step b) includes the step of, by said client, sending a TCP standard-based packet with said information about its valid IP addresses and a user datagram protocol (UDP) standard-based packet with said information about its actually used IP address to said server.

6. The online information exchange method as set forth in claim 1, wherein said step c) includes the step of, by said server, sending a UDP standard-based packet with said acknowledgement information to all of said IP addresses contained in said information sent at said step b), said acknowledgement information containing said information regarding said IP address of said client for actual access to said server via said router.

7. The online information exchange method as set forth in claim 1, wherein said step d) includes the steps of:
   d-1), by said client, comparing a list of IP addresses thereof with said IP address contained in said acknowledgement information sent at said step c); and
   d-2), by said client, recognizing that it uses said private network but employs a public IP address, if said IP address contained in said acknowledgement information is determined to be present in said IP address list at said step d-1), and that it uses said private network but employs no public IP address, if said IP address contained in said acknowledgement information is determined not to be present in said IP address list at said step d-1).

8. The online information exchange method as set forth in claim 1, wherein said step e) includes the steps of:
   e-1), by said client, notifying said server that said client employs the private IP address, if it is determined at said step d) that said client employs the private IP address;
   e-2), by said router, storing said information about said actually used IP address of said client and mapping it to said client; and
   e-3), by said router, connecting said server to said client via said actually used private IP address of said client stored therein to deliver the online information sent from said server to said client.

9. The online information exchange method as set forth in claim 8, wherein said step e-3) includes the step of releasing said IP address of said client mapped at said step e-2) if information is not exchanged between said server and said client for a predetermined period of time or more.

10. The online information exchange method as set forth in claim 1, wherein said step e) includes the steps of:
    e-1), by said client, notifying said server that said client employs no private IP address, if it is determined at said step d) that said client employs no private IP address; and
    e-2), by said server, recognizing from the notification at said step e-1) that said client uses said private network but employs a public IP address, and then exchanging the online information with said client via the public IP address.

11. The online information exchange method as set forth in claim 1 or claim 2, wherein said step b) includes the step of, by said client, sending information about its used port to said server together with said information about its valid IP addresses and said information about its actually used IP address; and wherein said step a-1) includes the step of, by said client, sending said information about its used port to said server together with said information about its IP address for access to said server.

12. A system for exchanging online information over a private network in a client/server system, said client/server system including a client for sending and receiving the online information over an Internet network, and a server connected to said client via a router, wherein said client is adapted for sending first information about its Internet protocol (IP) address for access to said server, to said server upon accessing the server, determining whether it uses said private network, from first acknowledgement information sent from said server in response to said first information, and sending second information to said server upon determining that it uses said private network, said second information containing information about valid IP addresses of said client and information about an actually used IP address of said client;

said server is adapted for comparing said access IP address contained in said first information sent from said client with an IP address of said client for actual access to said server via said router to determine whether the two IP addresses are the same, sending the determined result as said first acknowledgement information to said client and then sending second acknowledgement information to all of said IP addresses contained in said second information, sent from said client in response to said first acknowledgement information, such that said client determines on the basis of said second acknowledgement information whether it employs a private IP address, said second acknowledgement information containing information regarding said IP address of said client for actual access to said server via said router; and said router is adapted for storing said information about said actually used IP address of said client if said client determines on the basis of said second acknowledgement information from said server that it employs the private IP address, and then delivering a message sent from said server to said client via said actually used IP address of said client stored therein, such that said client exchanges the online information with said server.

13. The online information exchange system as set forth in claim 12, wherein said client employs a plurality of private or public IP addresses.

14. The online information exchange system as set forth in claim 12, wherein said client is further adapted for sending information about its used port to said server together with said first information about its IP address for access to said server and said second information containing said information about its valid IP addresses and said information about its actually used IP address.

15. The online information exchange system as set forth in claim 12, wherein said server is further adapted for sending a user datagram protocol (UDP) standard-based packet to said client via said router.

* * * * *